United States Patent
Ge et al.

(10) Patent No.: US 12,132,417 B2
(45) Date of Patent: Oct. 29, 2024

(54) GATE CONTROL CIRCUITRY FOR AUTOMOTIVE VARIABLE VOLTAGE CONVERTER

(71) Applicant: Ford Global Technologies, LLC, Dearborn, MI (US)

(72) Inventors: Baoming Ge, Okemos, MI (US); Lihua Chen, Farmington Hills, MI (US); Serdar Hakki Yonak, Ann Arbor, MI (US); Boris Curuvija, West Bloomfield, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 211 days.

(21) Appl. No.: 17/745,436

(22) Filed: May 16, 2022

(65) Prior Publication Data

US 2023/0369990 A1 Nov. 16, 2023

(51) Int. Cl.
| | |
|---|---|
| *H02M 7/797* | (2006.01) |
| *B60K 6/26* | (2007.10) |
| *B60L 53/20* | (2019.01) |
| *H02J 7/24* | (2006.01) |
| *H02M 1/08* | (2006.01) |
| *H02P 27/08* | (2006.01) |

(52) U.S. Cl.
CPC ............ *H02M 7/797* (2013.01); *B60L 53/20* (2019.02); *H02M 1/08* (2013.01); *H02P 27/08* (2013.01); *B60K 6/26* (2013.01); *H02J 7/2434* (2020.01)

(58) Field of Classification Search
CPC ......... B60L 53/20; H02M 1/08; H02M 7/797; H02M 1/38; H02P 27/08; H02J 7/2434
See application file for complete search history.

(56) References Cited

U.S. PATENT DOCUMENTS

| | | | |
|---|---|---|---|
| 10,525,841 B2 | 1/2020 | Zhou et al. | |
| 2014/0063883 A1* | 3/2014 | Familiant | H02M 1/38 363/131 |
| 2016/0200201 A1* | 7/2016 | Luedtke | B60L 7/14 307/10.1 |

FOREIGN PATENT DOCUMENTS

| | | |
|---|---|---|
| CN | 102332705 A | 1/2012 |
| CN | 203151083 U | 8/2013 |
| CN | 203932987 U | 11/2014 |

* cited by examiner

*Primary Examiner* — Said Bouziane
(74) *Attorney, Agent, or Firm* — David B. Kelley; Brooks Kushman P.C.

(57) ABSTRACT

A power converter includes a pair of series connected switches and circuitry. The circuitry includes another switch and an optocoupler that activates responsive to changes in current through one of the series connected switches exceeding a predefined threshold. Activation of the optocoupler causes the another switch to conduct and reduce a gate voltage of the one of the series connected switches to reduce the changes in current through the one of the series connected switches.

6 Claims, 8 Drawing Sheets

GATE CONTROL CIRCUITRY FOR AUTOMOTIVE VARIABLE VOLTAGE CONVERTER

TECHNICAL FIELD

This disclosure relates to automotive power systems.

BACKGROUND

An automotive vehicle may include an electric machine to generate propulsive power, and a traction battery to provide energy for and receive energy from the electric machine. Various power electronic circuitry is often disposed between the electric machine and traction battery.

SUMMARY

A variable voltage converter includes a pair of series connected switches and circuitry that includes another switch and an optocoupler that activates responsive to changes in current through at least one of the series connected switches exceeding a predefined threshold. Activation of the optocoupler causes the another switch to conduct and reduce a gate voltage of the at least one of the series connected switches to reduce the changes in current through the at least one of the series connected switches.

A method includes, responsive to changes in current through one of a pair of series connected switches exceeding a predefined threshold, activating an optocoupler to cause another switch to conduct and reduce a gate voltage of the one of the pair of series connected switches to reduce the changes in current through the one of the pair of series connected switches.

A vehicle power system includes a traction battery, an electric machine, and a power converter electrically between the traction battery and electric machine. The power converter includes a pair of series connected switches and circuitry. The circuitry includes another switch and an optocoupler that activates responsive to changes in current through one of the series connected switches exceeding a predefined threshold. Activation of the optocoupler causes the another switch to conduct and reduce a gate voltage of the one of the series connected switches to reduce the changes in current through the one of the series connected switches.

DETAILED DESCRIPTION

Embodiments are described herein. It is to be understood, however, that the disclosed embodiments are merely examples and other embodiments may take various and alternative forms. The figures are not necessarily to scale. Some features could be exaggerated or minimized to show details of particular components. Therefore, specific structural and functional details disclosed herein are not to be interpreted as limiting, but merely as a representative basis for teaching one skilled in the art.

Various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
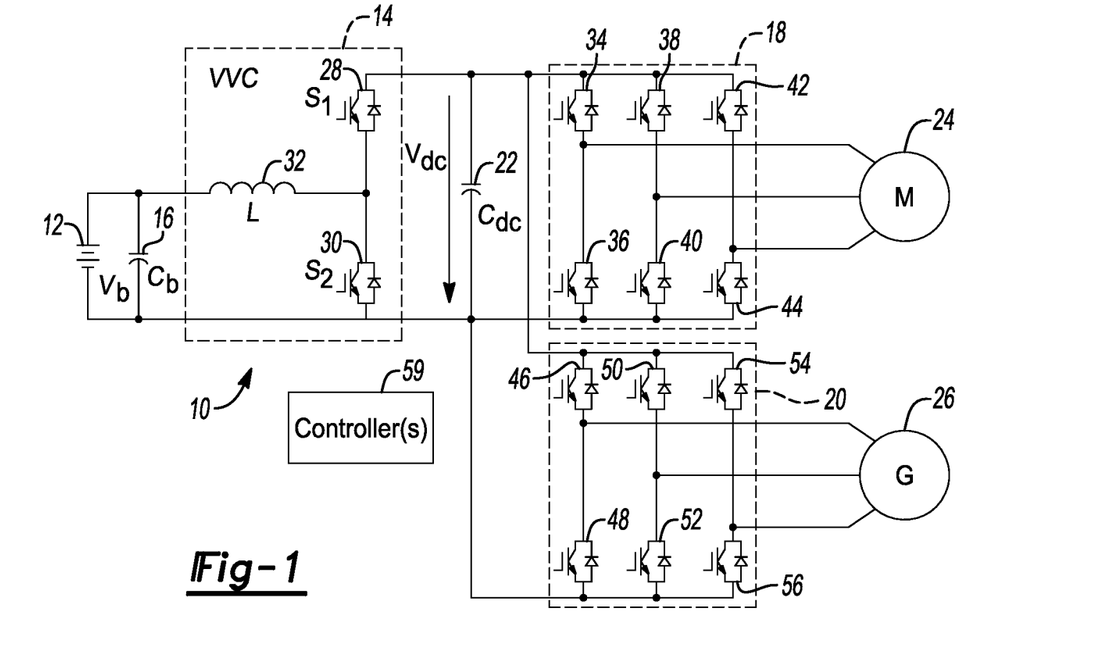
FIG. 1 is a schematic diagram of an automotive electric drive system.

FIG. 1 shows an electric drive (e-Drive) system 10 for a hybrid electric vehicle (HEV). It includes a traction battery 12, a variable voltage converter (VVC) 14, a capacitor 16 in parallel with and electrically between the traction battery 12 and VVC 14, inverters 18, 20, a capacitor 22 in parallel with and electrically between the VVC 14 and each of the inverters 18, 20, a traction motor 24 electrically connected with the inverter 18, and a generator 26 electrically connected with the inverter 20. The VVC 14 includes a pair of series connected field-effect transistors (FETs) 28, 30 (e.g., insulated-gate bipolar transistors (IGBTs)) and an inductor 32 that all share common node. Similarly, the inverters 18, 20 each include three such pairs of FETs 34-36, 38-40, 42-44, 46-48, 50-52, 54-56. One or more controllers 59 are in communication with/exert control over the elements previously mentioned.

The VVC 14 and inverter 18 may be operated, through control of the corresponding FETs 28, 30, 34, 36, 38, 40, 42, 44, to transfer power from the traction battery 12 to the traction motor 24. Likewise the VVC 14 and inverter 20 may be operated, through control of the corresponding FETs 28, 30, 46, 48, 50, 52, 54, 56 to transfer power from the generator 26 to the traction battery 12.

To not have circumstances in which one of the pairs of FETs are conducting at a same time, a pause time (e.g., small interval) during which both FETs of the pair are off is introduced into the standard pulse width modulation (PWM) control of the VVC 14 and the inverters 18, 20. Such a blanking time, however, can cause output waveform distortion and fundamental voltage loss in the inverters 18, 20, especially when the output voltage is low. For the VVC 14, the pause time may introduce other issues, as explained below.

Figure 2A:
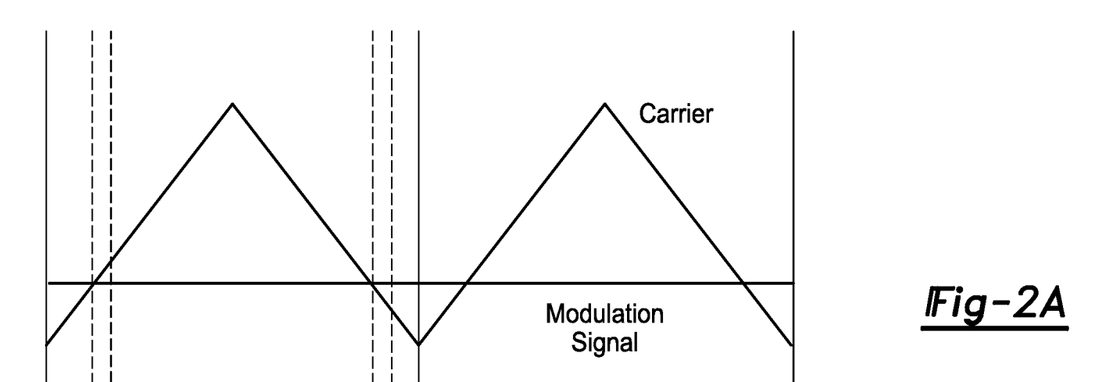
FIGS. 2A-2C are traces for carrier, modulation, and gate signals.
Figures 2B, 2C:
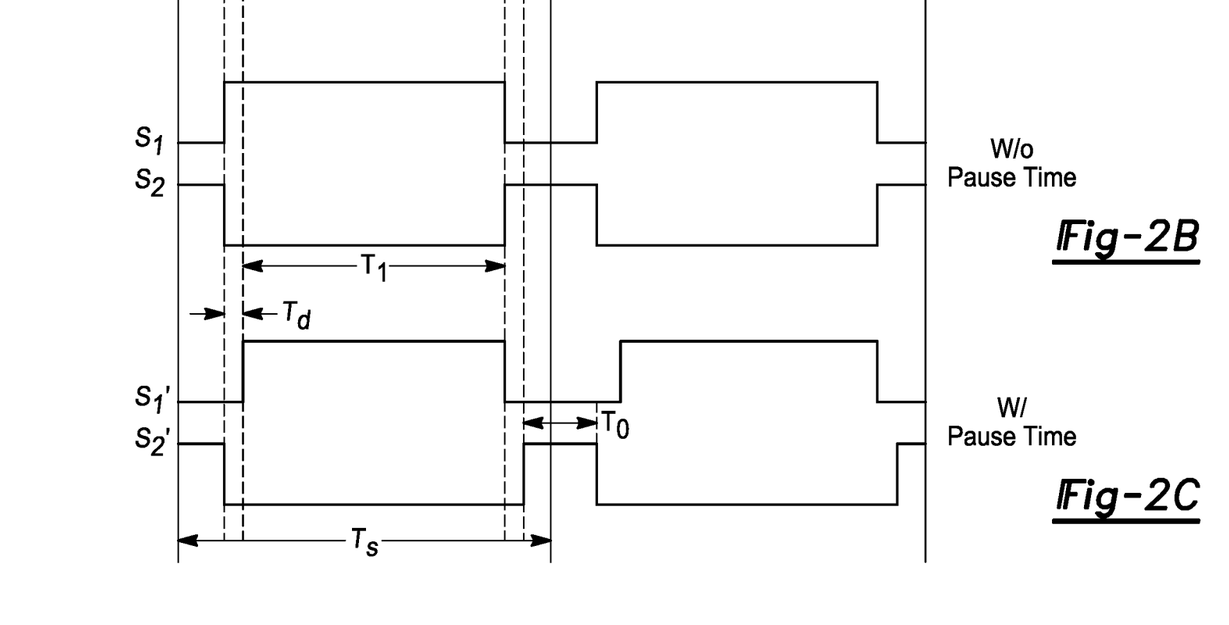

The PWM method is used to control the VVC 14. As shown in FIGS. 2A-2C, the modulation signal compares with the carrier to generate the gate signals $S_1$ and $S_2$ for the FETs 28, 30. A pause time $T_d$ can be introduced to not have the circumstance in which the FETS 28, 30 are conducting at a same time. The final gate signals to control the FETS 28, 30 are thus $S_1'$ and $S_2'$. The inserted pause time, however, may affect performance of the VVC 14.

When the traction battery 12 discharges, the duty cycle of the FET 30 is key to achieve voltage boost function. The boost voltage can be represented as $$V_{dc} = \frac{T_s}{T_s - T_0} V_b = \frac{1}{1-D} V_b \quad (1)$$

where $D = T_0/T_s$.

When the traction battery 12 charges, the duty cycle of the FET 28 is key to achieve voltage buck function. The pause time, however, causes the FET 28 to have a discontinuous duty cycle as follows:

1) The executive duty cycle of $S_1'$ is one to achieve pass through mode operation, i.e., $V_{dc}=V_b$.
2) The executive duty cycle of $S_1'$ is less than $(T_s-2T_d)/T_s$ and the minimum DC bus voltage is $$V_{dc} = \frac{T_s}{T_s - 2T_d}V_b = \frac{1}{1 - \frac{2T_d}{T_s}}V_b \quad (2)$$

Therefore, with the pause time $T_d$, the DC bus voltage is discontinuous and there is no value between $V_b$ and $V_b/(1-2T_d/T_s)$. For example, if $T_d=5$ μs and $T_s=100$ μs (10 kHz switching frequency), the FET 28 has the maximum duty cycle of 0.9, which leads to the minimum DC bus voltage of 1.11 $V_b$. If $V_b=220$V, then $V_{DC,min}=244$V. If the switching frequency is instead 20 kHz and $T_s=50$ μs, the maximum duty cycle is 0.8 and the minimum DC bus voltage is 1.25 $V_b$. If $V_b=220$V, then $V_{DC,min}=275$V. These issues can be summarized as follows:

1) In practical applications, the DC bus voltage is controlled by using closed-loop control. Discontinuous DC bus voltage operation (e.g., alternation of 220V and 275V) may cause low-frequency resonance, which generates large low-frequency current ripple in the traction battery 12 and inductor 32.
2) If the battery voltage is high, e.g., 400V, the minimum DC bus voltage may be over 500V. If this 500V voltage is not acceptable for the DC bus, the pass-through mode is an option so that the DC bus voltage is limited to 400V. This may limit motor/generator operation range.
3) The above are due to the pause time and may become more apparent when the switching frequency is higher.

Figure 3:
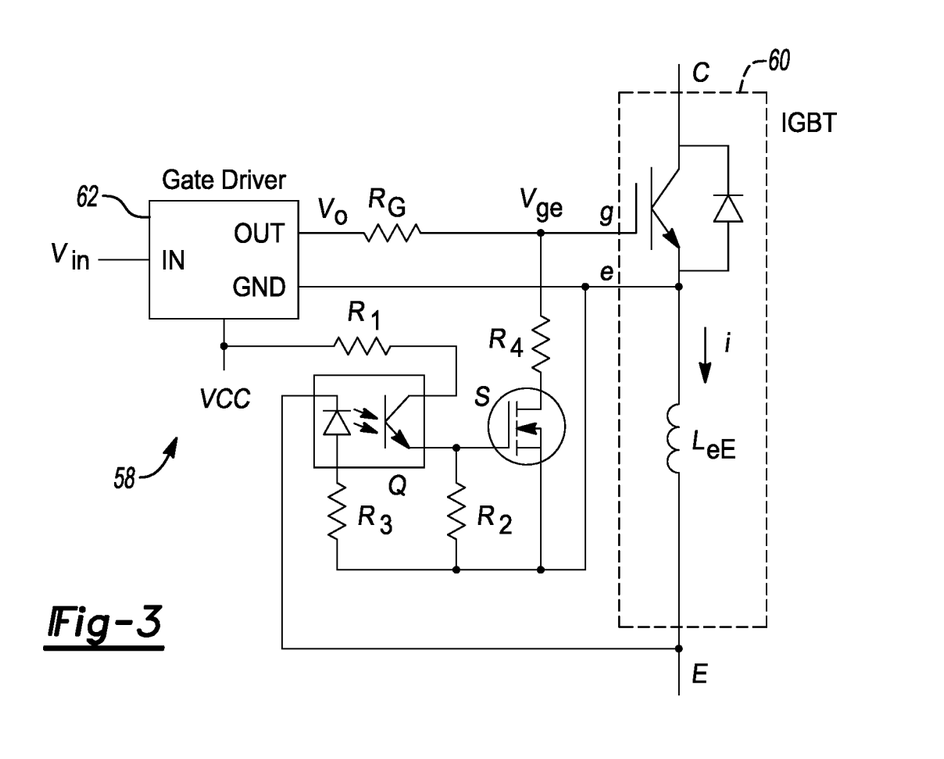
FIG. 3 is a schematic diagram of field-effect transistor gate control circuitry.
Figure 4A:
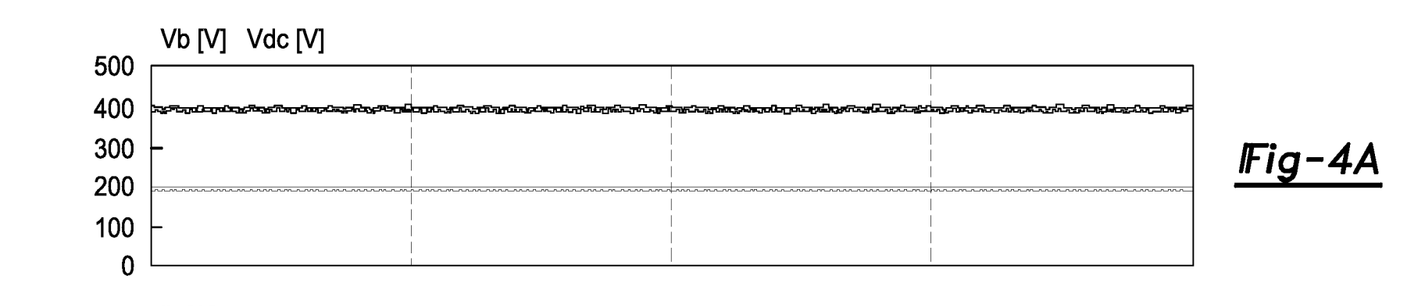
FIGS. 4A-4F are traces associated with various voltages and currents of the variable voltage converter of FIG. 1.
Figure 4B:
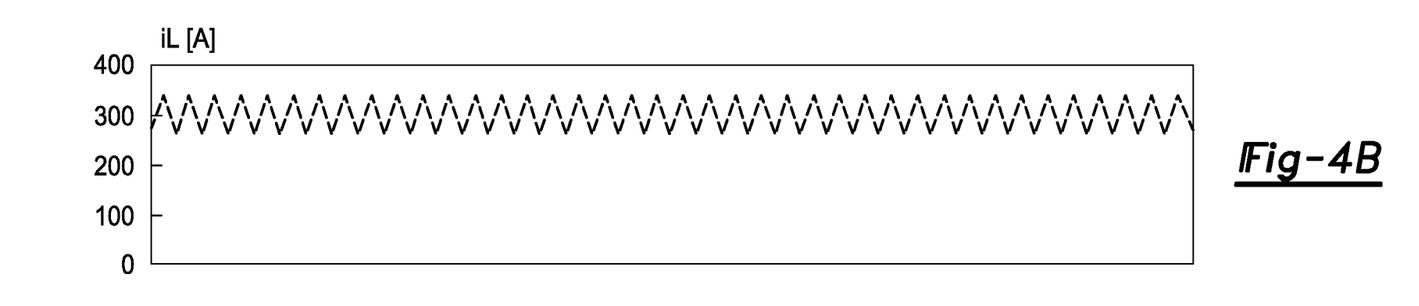
Figure 4C:
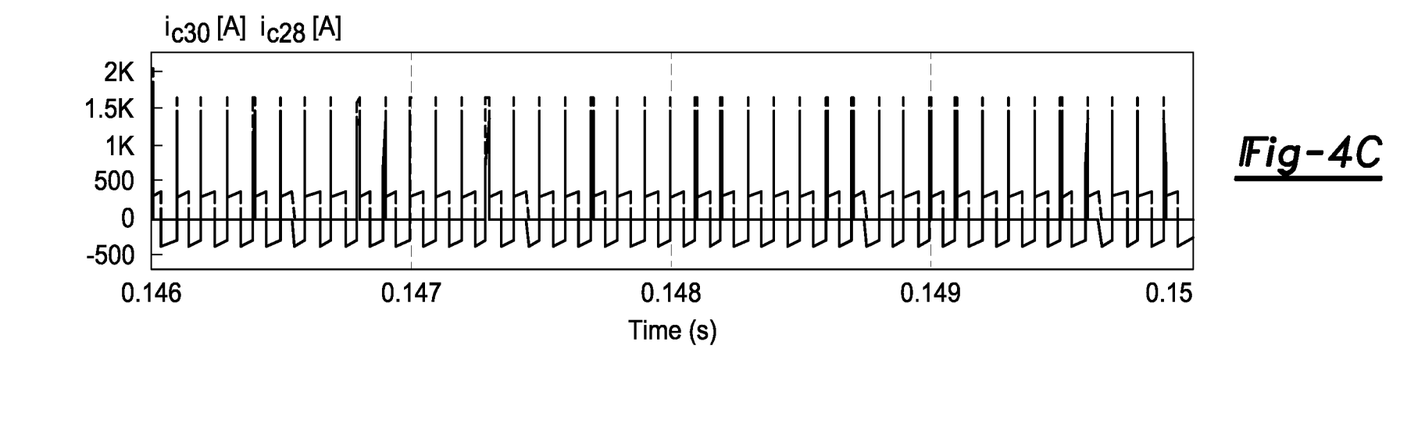
Figure 4D:
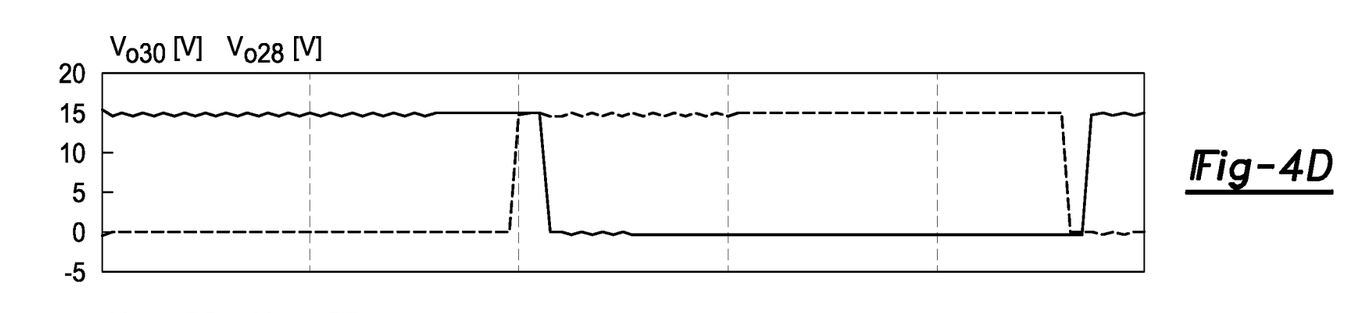
Figure 4E:
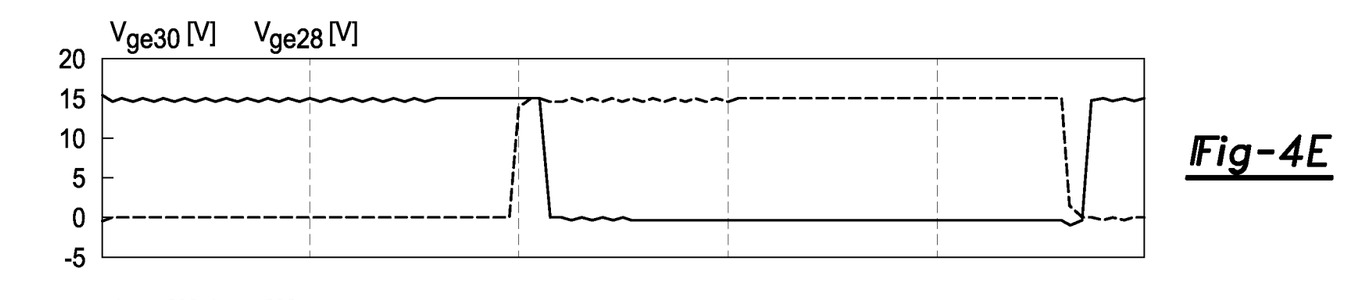
Figure 4F:
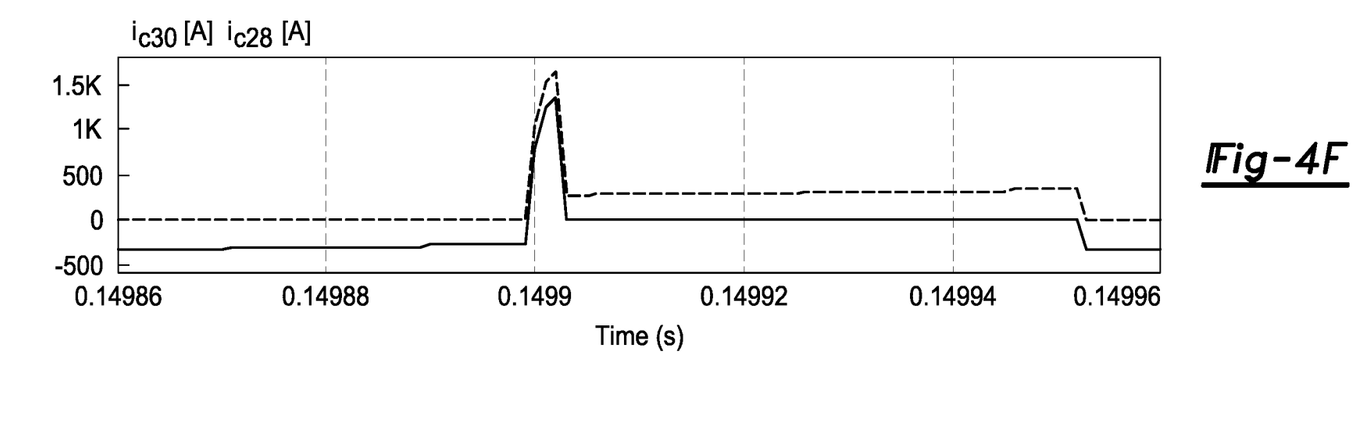
Figure 5A:
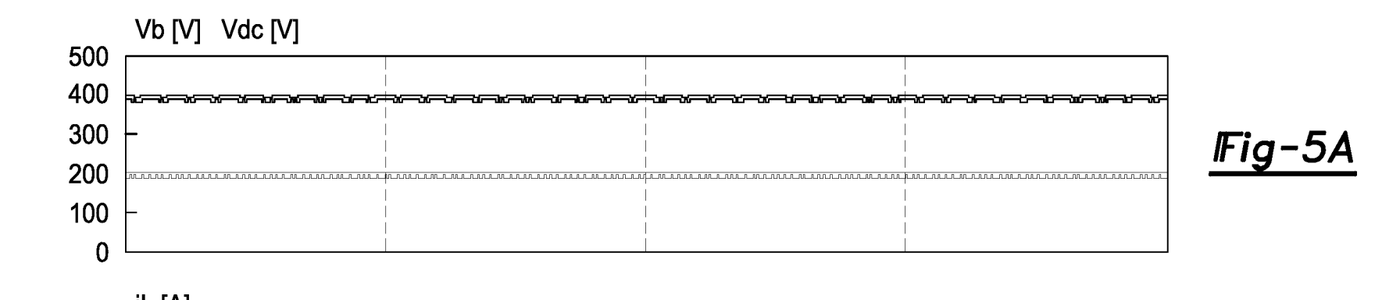
FIGS. 5A-5F are traces associated with various voltage and currents of a variable voltage converter utilizing the gate control circuitry of FIG. 3.
Figures 5B, 5C:
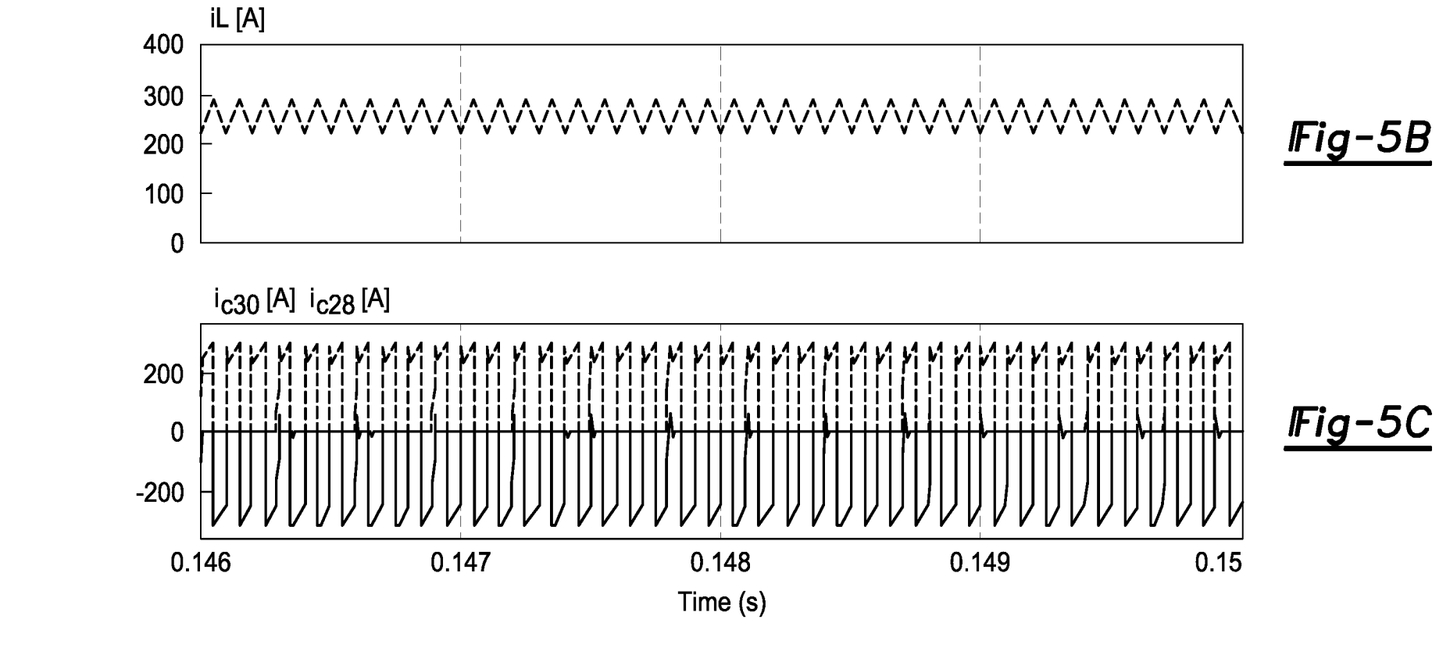
Figure 5D:
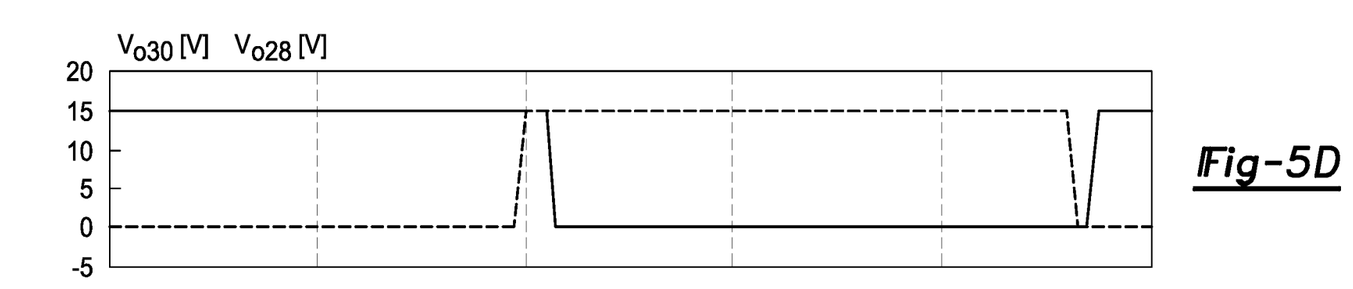
Figure 5E:
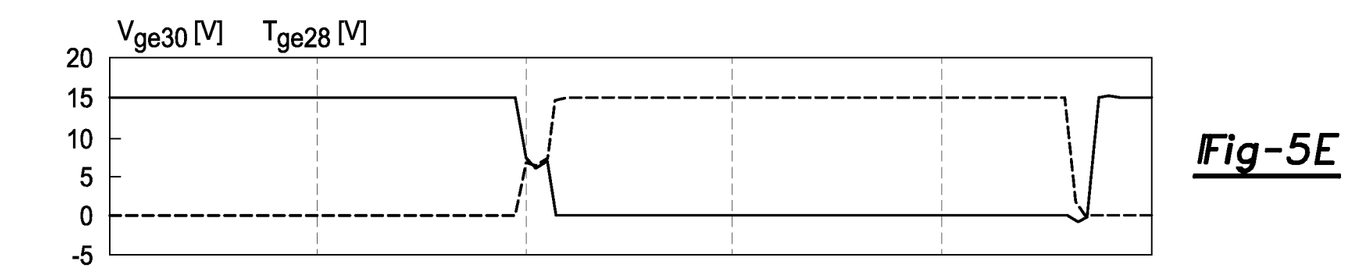
Figure 5F:
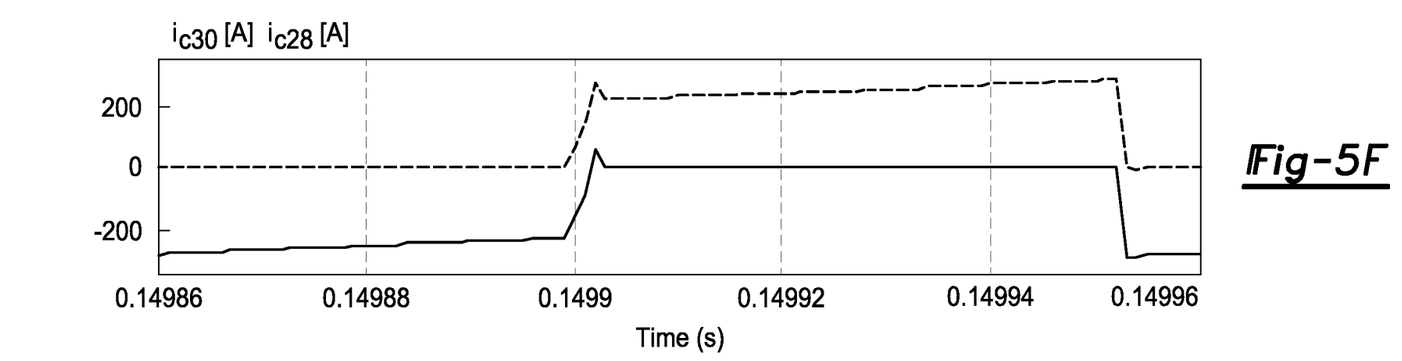
Figure 6A:
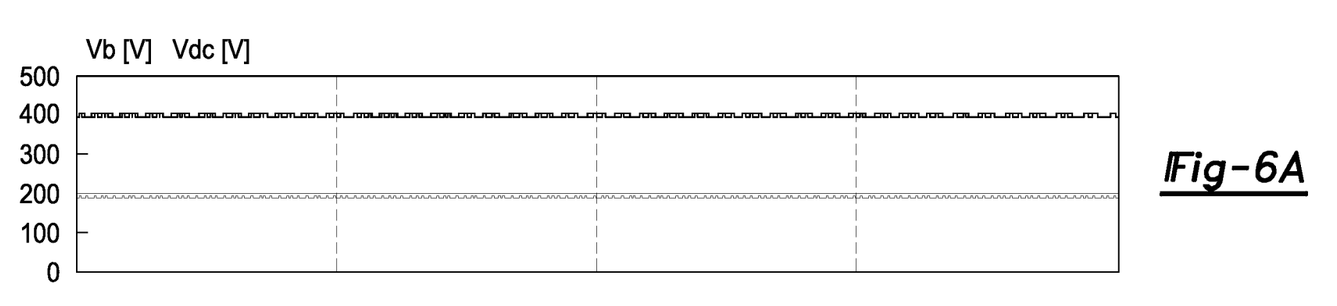
FIGS. 6A-6F are traces associated with various voltage and currents of a variable voltage converter utilizing the gate control circuitry of FIG. 3.
Figure 6B:
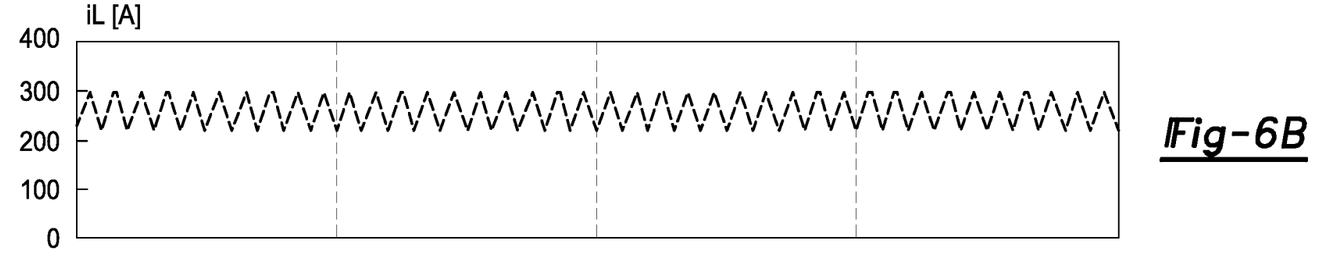
Figure 6C:
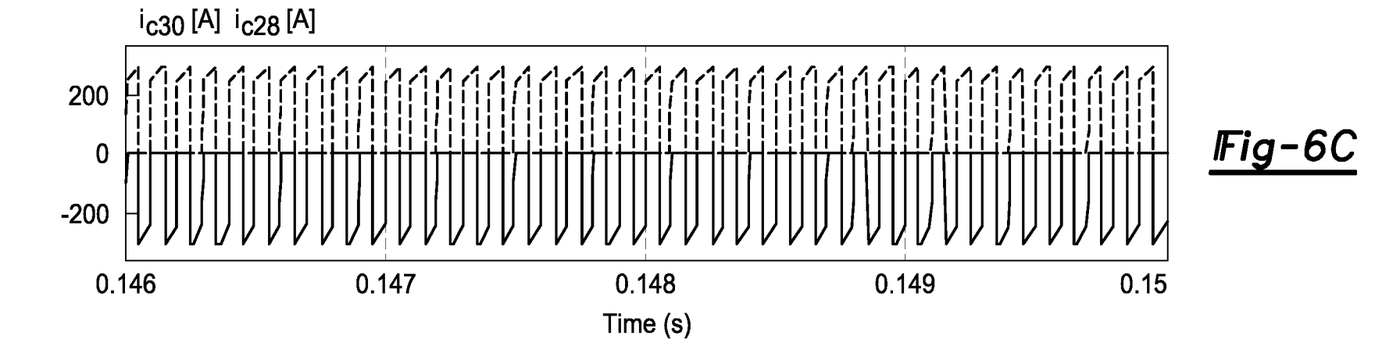
Figure 6D:
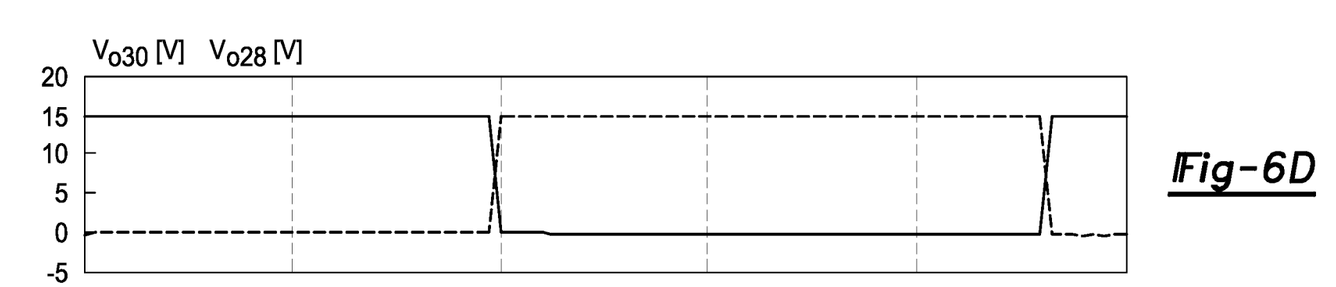
Figure 6E:
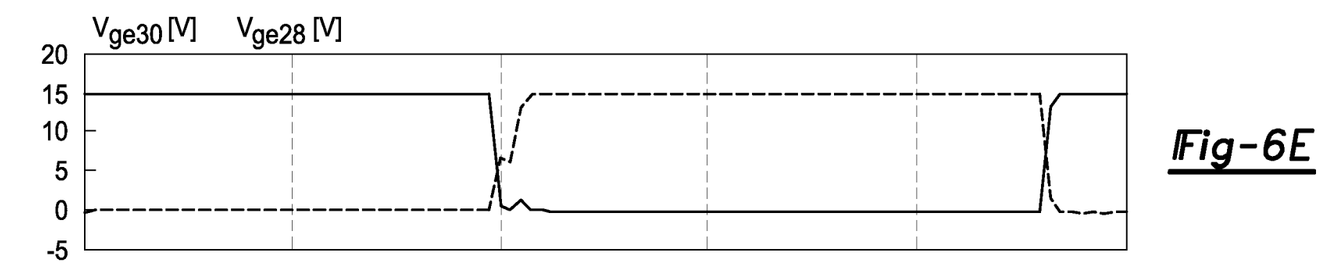
Figure 6F:
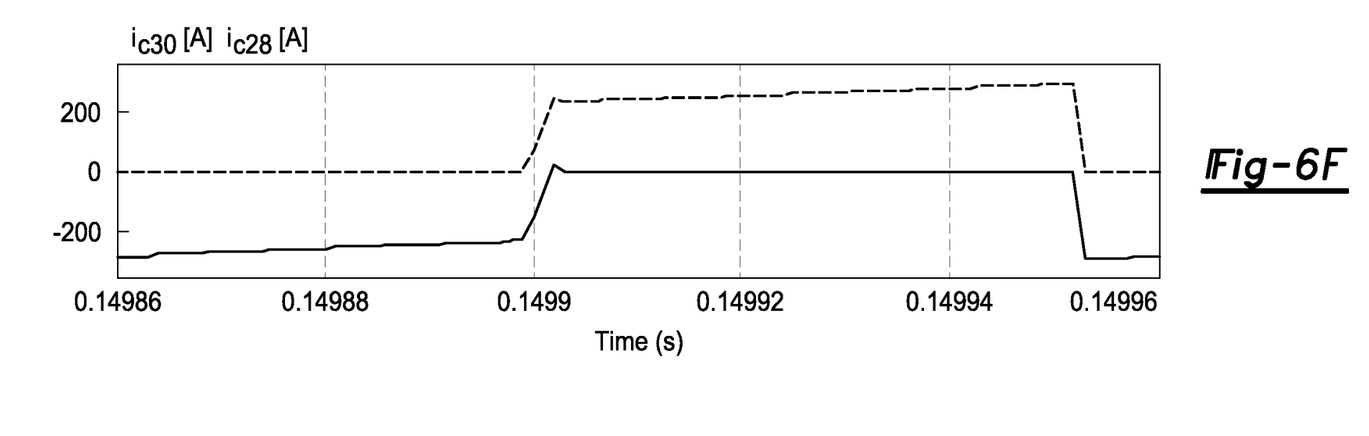

Here, circuitry is introduced that reduces or eliminates the pause time and allows the system to not have circumstances in which both FETs of a pair are conducting at a same time. FIG. 3 shows an example of such circuitry 58 within the context of a silicon-based IGBT 60 (silicon carbide metal-oxide-semiconductor field-effect transistors (MOSFETs), silicon MOSFETs, etc. may also be used). That is, the IGBT 60 can represent any of the FETs 28, 30, 34, 36, 38, 40, 42, 44, 46, 48, 50, 52, 54, 56. $L_{eE}$ is the stray inductance between emitter e of the IGBT 60 and terminal E of the IGBT 60. The circuitry 58 further includes an optocoupler Q, resistors $R_1$, $R_2$, $R_3$, $R_4$, $R_G$, switch S (e.g., MOSFET), and gate driver 62. The optocoupler Q senses the change in current (di/dt) of the IGBT 60 and is electrically connected with a power supply VCC of the gate driver 62 through the resistor $R_1$. The resistors $R_2$, $R_3$ are electrically connected between the optocoupler Q and the emitter e. The resistor $R_4$ and MOSFET S are electrically connected with each other and between gate g of the IGBT 60 and the emitter e. The gate driver 62 is electrically connected with the gate g through the resistor $R_G$. The gate of the MOSFET S is electrically connected with the output of the optocoupler Q and resistor $R_2$. The cathode of the optocoupler Q is connected to the terminal E of the IGBT 60. The anode of the optocoupler Q is connected to the resistor $R_3$.

If the change in current is greater than a predefined threshold (which can be set based on design considerations and/or simulation), the optocoupler Q turns on and the voltage across the resistor $R_2$ will drive the MOSFET S. The voltage drop on $L_{eE}$ will increase as the change in current increases (i.e., di/dt increases), and thus a large voltage drop will exist between the emitter e, which will be positive, and the terminal E, which will be negative, resulting in current flow through the resistor $R_3$ and optocoupler Q that activates the light emitting diode therein. As a result, the gate voltage $V_{ge}$ of the IGBT 60 is slowly lowered to reduce the change, which limits the IGBT current (when $V_{ge}$ is high, the IGBT 60 will be ON). If the change in current is lower than the threshold, the optocoupler Q and MOSFET S are OFF, and the gate voltage $V_{ge}$ is not affected when driving the IGBT 60.

When each of the FETs 28, 30, 34, 36, 38, 40, 42, 44, 46, 48, 50, 52, 54, 56, employs the circuitry 58, the e-Drive system 10 does not encounter circumstances in which both FETs of a given pair are conducting even if there is no pause time. The VVC 14 does not encounter discontinuous DC bus voltage operation so that low-frequency resonance and over boost voltage will not happen. The inverters 18, 20 do not encounter output waveform distortion and fundamental voltage loss to increase motor drive performance. As such, the e-Drive system may exhibit better performance.

The e-drive system 10 was used as an example in simulation to verify operation, where the FETs 28, 30 with their drivers employ the circuitry 58. In this simulation, there was no pause time inserted between control signals (i.e., $V_{in}$ in FIG. 3) of the FETs 28, 30. Also, the battery voltage is 200V and the DC bus voltage is boosted to 400V.

First, it was examined how a conventional solution (the circuitry 58 not used) responds when the gate driver of the FET 28 introduces a 2.2 μs delay to the gate control voltage $V_{o28}$ in comparison with $V_{o30}$ of the FET 30. FIGS. 4A-4F show the response from the conventional version of the VVC 14. The 2.2 μs delay causes circumstances in which the FETs 28, 30 are conducting at a same time. The ON state of the FETs 28, 30 leads to currents $i_{c30}$ and $i_{c28}$ flowing through the FETs 28, 30 even though current through the inductor current 32 is not affected.

Second, it was examined how the circuitry 58 works to not have circumstances in which the FETs 28, 30 are conducting at a same time when the gate driver of the FET 28 introduces a 2.2 μs delay to the gate control voltage $V_{o28}$ in comparison with the $V_{o30}$ of the FET 30. FIGS. 5A-5F show the response of the VVC 14. Even though $V_{o28}$ and $V_{o30}$ have an overlapped high-level voltage, the gate voltages $V_{ge28}$ and $V_{ge30}$ are reduced from the high level by feedback control of the optocoupler-based circuits to not have circumstances in which the FETs 28, 30 are conducting at a same time. As a result, the currents $i_{c28}$ and $i_{c30}$ of the FETs 28, 30 are well limited in FIGS. 5A-5F, which verifies effectiveness of the proposed arrangement.

Finally, it was examined how the circuitry 58 works for the case when the two gate signals are complementary. In other words, the two gate control voltages $V_{o28}$ and $V_{o30}$ have no overlapped high-level voltage. FIGS. 6A-6F show the response from the proposed VVC 14, which verifies its effectiveness.

The optocoupler-based feedback control circuit is employed to adjust FET gate voltage by sensing the collector current di/dt. As a result, the change in current through the FET is well managed.

The VVC 14 and inverters 18, 20 do not encounter the circumstances in which both FETs of a pair are conducting at a same time even though there is no pause time in the control signals. Other arrangements may require pause times (e.g., 2-5 μs) for their inverters and VVC to facilitate switching between the upper and lower switches.

VVCs that adopt the proposed circuitry may not have discontinuous DC bus voltage operation so that low-frequency resonance and over boost voltages do not occur.

Inverters that adopt the proposed circuity may not have output waveform distortion and fundamental voltage loss. As a result, corresponding e-drive system performance may increase.

The algorithms, methods, or processes disclosed herein can be deliverable to or implemented by a computer, controller, or processing device, which can include any dedicated electronic control unit or programmable electronic control unit. Similarly, the algorithms, methods, or processes can be stored as data and instructions executable by a computer or controller in many forms including, but not limited to, information permanently stored on non-writable storage media such as read only memory devices and information alterably stored on writeable storage media such as compact discs, random access memory devices, or other magnetic and optical media. The algorithms, methods, or processes can also be implemented in software executable objects. Alternatively, the algorithms, methods, or processes can be embodied in whole or in part using suitable hardware components, such as application specific integrated circuits, field-programmable gate arrays, state machines, or other hardware components or devices, or a combination of firmware, hardware, and software components.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. The words controller and controllers may be interchanged herein. Also, the word switch contemplates contactor(s), field-effect transistor(s), and other electrical disconnect devices.

As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A variable voltage converter comprising:
a pair of series connected switches; and
circuitry including a metal oxide semiconductor field effect transistor and an optocoupler configured to activate responsive to changes in current through at least one of the series connected switches exceeding a predefined threshold, wherein activation of the optocoupler causes the metal oxide semiconductor field effect transistor to conduct and reduce a gate voltage of the at least one of the series connected switches to reduce the changes in current through the at least one of the series connected switches.

2. The variable voltage converter of claim 1, wherein the series connected switches are insulated gate bipolar transistors.

3. A method comprising:
responsive to changes in current through one of a pair of series connected switches exceeding a predefined threshold, activating an optocoupler to cause a metal oxide semiconductor field effect transistor to conduct and reduce a gate voltage of the one of the pair of series connected switches to reduce the changes in current through the one of the pair of series connected switches.

4. The method of claim 3, wherein the series connected switches are insulated gate bipolar transistors.

5. A vehicle power system comprising:
a traction battery;
an electric machine; and
a power converter electrically between the traction battery and electric machine, and including a pair of series connected switches and circuitry, wherein the circuitry includes a metal oxide semiconductor field effect transistor and an optocoupler configured to activate responsive to changes in current through one of the series connected switches exceeding a predefined threshold, wherein activation of the optocoupler causes the metal oxide semiconductor field effect transistor to conduct and reduce a gate voltage of the one of the series connected switches to reduce the changes in current through the one of the series connected switches.

6. The system of claim 5, wherein the series connected switches are insulated gate bipolar transistors.

* * * * *